US012623460B2

(12) United States Patent
Sato et al.

(10) Patent No.: US 12,623,460 B2
(45) Date of Patent: May 12, 2026

(54) MAINTENANCE UNIT AND LIQUID EJECTION DEVICE

(71) Applicant: SEIKO EPSON CORPORATION, Tokyo (JP)

(72) Inventors: Hisashi Sato, Shiojiri (JP); Koji Tanaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 141 days.

(21) Appl. No.: 18/603,305

(22) Filed: Mar. 13, 2024

(65) Prior Publication Data

US 2024/0308226 A1 Sep. 19, 2024

(30) Foreign Application Priority Data

Mar. 16, 2023 (JP) ................................ 2023-041684

(51) Int. Cl.

*B41J 2/17* (2006.01)
*B41J 2/165* (2006.01)
*B41J 11/00* (2006.01)
*B41J 2/21* (2006.01)

(52) U.S. Cl.

CPC ......... *B41J 2/1721* (2013.01); *B41J 2/16535* (2013.01); *B41J 11/00214* (2021.01); *B41J 2/16526* (2013.01); *B41J 2002/1655* (2013.01); *B41J 2/2114* (2013.01)

(58) Field of Classification Search

CPC .................. B41J 2/1721; B41J 2/16535; B41J 11/00214; B41J 2/2114; B41J 2002/1655; B41J 2/16526

See application file for complete search history.

(56) References Cited

U.S. PATENT DOCUMENTS

2012/0050394 A1* 3/2012 Takada ................. B41J 2/16585 347/27
2018/0009245 A1* 1/2018 Sasaki .................... B41J 2/1714
2022/0242128 A1* 8/2022 Sato ..................... B41J 2/16517

FOREIGN PATENT DOCUMENTS

JP 2018-177393 A 11/2018
JP 2021-066047 A 4/2021
JP 2022-119307 A 8/2022

* cited by examiner

*Primary Examiner* — Henok D Legesse

(74) *Attorney, Agent, or Firm* — WORKMAN NYDEGGER

(57) ABSTRACT

A maintenance unit configured to receive liquid discharged as a waste liquid from an ejection section that ejects the liquid onto a medium, the liquid being cured by a hardening process, the maintenance unit includes a belt-shaped absorbing member configured to absorb the liquid and to receive the liquid at a receiving region of the absorbing member, a rotor configured to transport the absorbing member in a feeding direction, a guide roller provided downstream of the receiving region in the feeding direction and around which winds the absorbing member, and a first regulating section is provided on the ejection section side of the absorbing member that is located between the receiving region and the center shaft of the downstream roller with respect to the feeding direction.

19 Claims, 10 Drawing Sheets

MAINTENANCE UNIT AND LIQUID EJECTION DEVICE

The present application is based on, and claims priority from JP Application Serial Number 2023-041684, filed Mar. 16, 2023, the disclosure of which is hereby incorporated by reference herein in its entirety.

BACKGROUND

1. Technical Field

The present disclosure relates to a maintenance unit and a liquid ejection device.

2. Related Art

JP-A-2022-119307 discloses a liquid ejecting device provided with a head configured to eject liquid, a curing section for curing the liquid by applying energy to the liquid, and a waste liquid collection section to collect the liquid as a waste liquid. The head is an example of an ejection section, and a curing section is an example of a processing section. The liquid ejection device is an example of a liquid ejecting apparatus, and the waste liquid collection section is an example of a maintenance unit. The waste liquid collection section has a belt-shaped absorbing body for receiving liquid ejected from the head during the maintenance of the head, a first rotating shaft for holding unused absorbing body, and a second rotating shaft for holding used absorbing body. The waste liquid collection section receives the liquid ejected from the head at a portion of the belt-shaped absorbing body wound between the two guide rollers during the maintenance of the head. The curing section applies energy to the absorption portion of the absorbing body that has received the liquid, thereby curing the liquid in the absorption portion. The waste liquid collection section winds up the absorption portion, in which the liquid is cured, around the second rotating shaft.

However, in the waste liquid collection section disclosed in JP-A-2022-119307, when the absorption portion with cured liquid passes by the guide roller in the winding of the absorbing body around the rotating shaft, there is a risk that the absorption portion may not follow the circumferential surface of the guide roller. As a result, a portion of the absorbing body wound between the two guide rollers may float in a direction approaching the head.

SUMMARY

A maintenance unit configured to receive liquid discharged as a waste liquid from an ejection section that ejects the liquid onto a medium, the liquid being cured by a hardening process, the maintenance unit includes a belt-shaped absorbing member configured to absorb the liquid and to receive the liquid at a receiving region of the absorbing member, a transport section configured to transport the absorbing member in a feeding direction, a downstream roller provided downstream of the receiving region in the feeding direction and around which winds the absorbing member, and a first regulating section is provided on the ejection section side of the absorbing member that is located between the receiving region and the center shaft of the downstream roller with respect to the feeding direction.

A liquid ejection device includes an ejection section configured to eject liquid that is curable by a hardening process onto a medium, a maintenance unit configured to receive the liquid discharged as a waste liquid from the ejection section, and a first regulating section, wherein the maintenance unit has a belt-shaped absorbing member configured to absorb the liquid and to receive the liquid at a receiving region of the absorbing member, a transport section configured to transport the absorbing member in a feeding direction, a downstream roller provided downstream of the receiving region in the feeding direction and around which the absorbing member winds, and a first regulating section provided on the ejection section side of the absorbing member located between the receiving region and the center shaft of the downstream roller with respect to the feeding direction.

DESCRIPTION OF EMBODIMENTS

Figure 1:
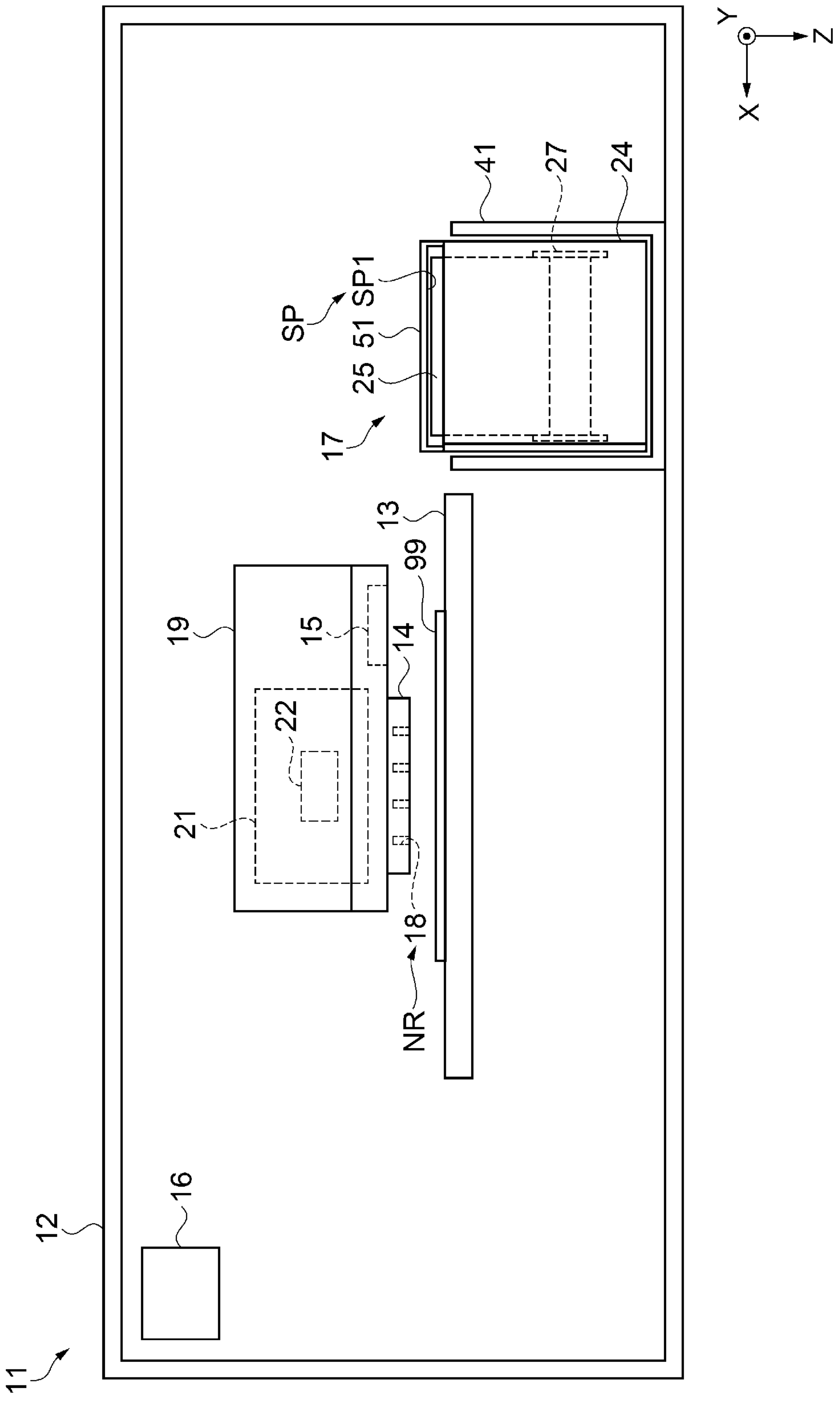
FIG. 1 is a schematic front view showing an embodiment of a liquid ejection device.

Hereinafter, the present disclosure will be described based on embodiments. In each figure, the same members are denoted by the same reference numerals, and a repetitive description will be omitted. In the present specification, “same” and “at the same time” not only mean completely the same, but also include the same in consideration of measurement errors, the same in consideration of manufacturing variations of members, and the same in a range in which functions are not impaired. Therefore, for example, “both dimensions are the same” means that the difference between both dimensions is within ±10%, more preferably within ±5%, and particularly preferably within ±3% of one dimension in consideration of measurement errors and manufacturing variations of members.

In each figure, X, Y, and Z represents three spatial axes orthogonal to each other. In this specification, directions extending along these axes are referred to as an X-axis direction, a Y-axis direction, and a Z-axis direction. In a case where the direction is specified, positive and negative signs are used together with direction notation, that is, a positive direction is set as “+” and a negative direction is set as “−”, and a direction in which an arrow in each drawing is directed is set as a + direction and a direction opposite to the arrow is set as a − direction.

The Z-axis direction indicates the gravity direction, the +Z direction indicates the vertical downward direction, and the −Z direction indicates the vertical upward direction. A plane including the X-axis and the Y-axis will be described as an X-Y plane, a plane including the X-axis and the Z-axis will be described as an X-Z plane, and a plane including the Y-axis and the Z-axis will be described as a Y-Z plane. The X-Y plane is a horizontal plane. Further, the three spatial axes of X, Y, and Z, when not limited to positive or negative directions, are described as the X-axis, the Y-axis, and the Z-axis, respectively.

In each drawing, the X-axis direction is the width direction of a housing 12 in a liquid ejection device 11 which will be described later, and is also the direction that intersects the feeding direction in which an absorbing member 25 is transported, that is, the width direction of the absorbing member 25. In the X-axis direction, the −X direction is the right direction as viewed from the user position when the front surface of the housing 12 faces the user, and the +X direction is the left direction in the same manner. In the present embodiment, among the side surfaces constituting the periphery of the housing 12, the side surface to which a maintenance unit 17 is attached and detached is the front surface of the housing 12.

The Y-axis direction is the depth direction of the housing 12. In the Y-axis direction, the −Y direction is a direction from the front surface of the housing 12 toward the rear surface of the housing 12. In the Y-axis direction, the +Y direction is a direction from the rear surface of the housing 12 toward the front surface of the housing 12.

1. First Embodiment

A liquid ejection device 11 is, for example, an inkjet printer that records an image such as a character or a photograph by ejecting ink, which is an example of a liquid, onto a medium 99 such as paper or fabric.

As shown in FIG. 1, the liquid ejection device 11 includes the housing 12, a support section 13, an ejection section 14, a carriage 19, a liquid container section 21, a temperature raising section 22, a processing section 15, a control section 16, the maintenance unit 17, and a regulating section SP.

The housing 12 accommodates various configurations of the liquid ejection device 11.

The support section 13 is configured to support the medium 99. The support section 13 supports the medium 99. The support section 13 is provided in the housing 12 so as to be movable along the Y-axis direction between a loading position on the +Y direction side of the housing 12 and a recording position located inside the housing 12. The loading position is a position where the medium 99 is placed. The recording position is a position at which the ejection section 14 performs recording on the medium 99 supported by the support section 13.

The ejection section 14 is configured to eject liquid. The ejection section 14 includes one or more nozzles 18 that eject liquid. At the recording position, the ejection section 14 records an image on the medium 99 by ejecting liquid from the nozzles 18 onto the medium 99 supported by the support section 13.

The ejection section 14 may include a plurality of nozzle groups NR configured by a plurality of nozzles 18. The ejection section 14 may be configured to eject different types of liquid from each of the nozzle groups NR. The plurality of nozzle groups NR may be arranged at intervals in the X-axis direction. The plurality of nozzles 18 constituting the nozzle group NR may be arranged at intervals in the Y-axis direction to form a nozzle row.

The carriage 19 is equipped with the ejection section 14. The ejection section 14 records an image on the medium 99 by scanning the carriage 19 with respect to the medium 99 in the X-axis direction. In the present embodiment, the carriage 19 is configured to not only scan the medium 99 but also to move in the Y-axis direction. That is, the liquid ejection device 11 is a so-called lateral printer. The liquid ejection device 11 may be a serial printer that scans the medium 99, or may be a line printer that can simultaneously eject liquid across a width of the medium 99.

The liquid container section 21 is configured to contain liquid. The liquid container section 21 is mounted on, for example, the carriage 19. The liquid container section 21 is coupled to the ejection section 14. Thus, the liquid contained in the liquid container section 21 is supplied to the ejection section 14.

The temperature raising section 22 is configured to raise the temperature of the liquid. The temperature raising section 22 includes, for example, a heating element. The temperature raising section 22 generates heat, for example, when a voltage is applied thereto. The temperature raising section 22 is mounted, for example, on the carriage 19. The temperature raising section 22 raises the temperature of the liquid contained, for example, in the liquid container section 21.

The temperature raising section 22 raises the temperature of the liquid in order to make the liquid have an appropriate viscosity when the ejection section 14 ejects the liquid. When the temperature of the liquid is low, the viscosity of the liquid increases. In this case, the ejection section 14 cannot eject the liquid appropriately. Therefore, while the temperature raising section 22 raises the temperature of the liquid, the liquid ejection device 11 cannot normally perform recording. The temperature raising section 22 raises the temperature of the liquid, for example, when the power of the liquid ejection device 11 is turned on. When the temperature of the liquid is raised to an appropriate temperature, the temperature raising section 22 is driven to maintain the temperature of the liquid.

The processing section 15 is configured to apply energy to the liquid to thereby cure the liquid. The processing section 15 is configured to emit, for example, light energy, thermal energy, electric energy, or the like as energy. The processing section 15 emits energy when a voltage is applied thereto, for example. Curing of the liquid is promoted by the processing section 15 applying energy to the liquid in accordance with the properties of the liquid.

In the present embodiment, the processing section 15 is configured to irradiate the liquid with ultraviolet light, so-called UV light, as an example of light energy. Therefore, the processing section 15 of the present embodiment includes, for example, a light emitting element. In the present embodiment, the liquid ejected by the ejection section 14 is cured by irradiation with ultraviolet rays performed as a process. In the present embodiment, the liquid ejected by the ejection section 14 is, for example, ultraviolet curable ink, so-called UV ink. Ultraviolet curable ink is an example of an ink and an example of a liquid.

The liquid ejected by the ejection section 14 may be a liquid containing a thermosetting resin, for example, a thermosetting ink. Thermosetting ink is an example of an ink and an example of a liquid. The thermosetting ink is cured by heating performed as a treatment. In this case, for example, the processing section 15 may apply infrared rays to the liquid, may apply radiant heat to the liquid, or may apply microwaves to the liquid.

Figure 8:
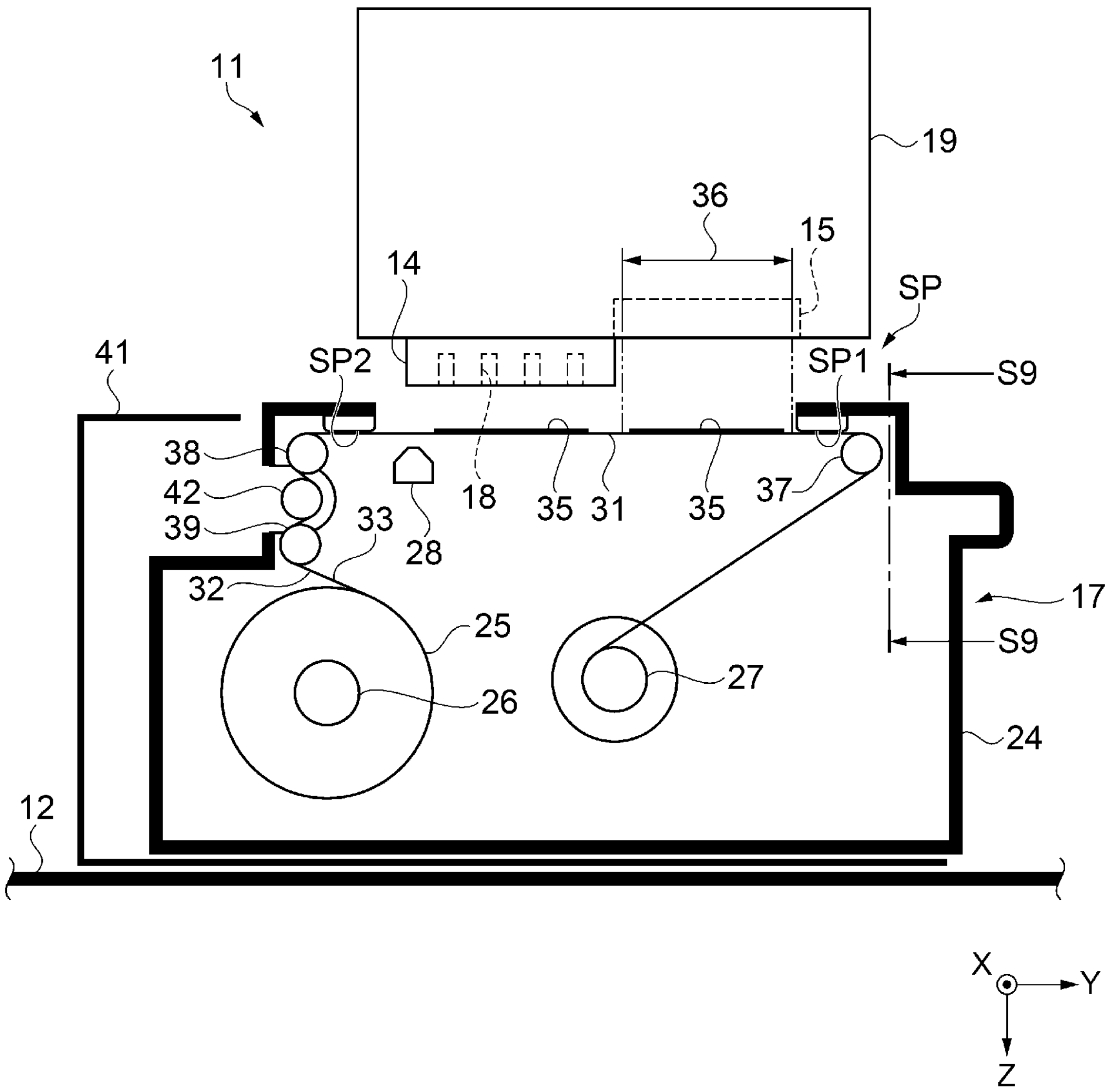
FIG. 8 is a schematic side view showing another embodiment of the maintenance unit.

The processing section 15 is mounted on, for example, the carriage 19. The processing section 15 is mounted on the carriage 19 side by side with the ejection section 14 in the X-axis direction. In the present embodiment, the processing section 15 is disposed on the −X direction side of the ejection section 14. The processing section 15 may be mounted on the carriage 19 side by side with the ejection section 14 in the Y-axis direction. In this case, for example, as shown in FIG. 8, the processing section 15 may be arranged on the +Y direction side of the ejection section 14. The processing section 15 fixes the liquid to the medium 99 by applying energy to the liquid ejected onto the medium 99 while the carriage 19 moves.

The control section 16 integrally controls, for example, the liquid ejection device 11. The control section 16 controls, for example, the ejection section 14, the maintenance unit 17 to be described later, the carriage 19, and the temperature raising section 22. The control section 16 may be configured as a circuit that includes one or more processors, one or more dedicated hardware circuits such as application specific integrated circuits that perform at least some of the various processes, or a combination thereof. The processor executes various processes according to a computer program. The processor includes a CPU and memories such as a RAM, a ROM and the like. The memory stores program code or instructions configured to cause the CPU to perform the process. The memory, that is, the computer-readable medium, includes any readable medium that can be accessed by a general purpose or special purpose computer.

The maintenance unit 17 is provided in a mount section 41 so as to be attachable and detachable from the +Y direction side which is the front surface of the housing 12. The mount section 41 is provided at a position adjacent to the −X direction side of the support section 13 in the housing 12. The maintenance unit 17 mounted on the mount section 41 is located at a position adjacent to the −X direction side of the support section 13.

The maintenance unit 17 is configured to receive the liquid ejected from the ejection section 14 as the waste liquid. The waste liquid is liquid that does not contribute to an image recorded on the medium 99. The waste liquid is generated by, for example, maintenance of the ejection section 14. The maintenance unit 17 collects waste liquid ejected from the ejection section 14 positioned directly above. For example, the maintenance of the ejection section 14 includes flushing, cleaning, and wiping.

Flushing is an operation of ejecting liquid from the nozzles 18 at the appropriately timing in order to suppress clogging of the nozzles 18. Flushing is performed, for example, before, during, and after recording. When flushing is executed, the ejection section 14 ejects the liquid toward the maintenance unit 17.

Cleaning is an operation of forcibly ejecting the liquid from the nozzles 18 by pressurizing the upstream side in the supply direction of the liquid supplied to the ejection section 14 for the purpose of discharging air bubbles in the ejection section 14, suppressing thickening of the liquid, or the like.

Wiping is an operation of wiping the ejection section 14 in order to remove the liquid adhering to the ejection section 14. Wiping is performed, for example, after cleaning. In the present embodiment, when wiping is performed, the ejection section 14 is wiped by the maintenance unit 17.

Figure 2:
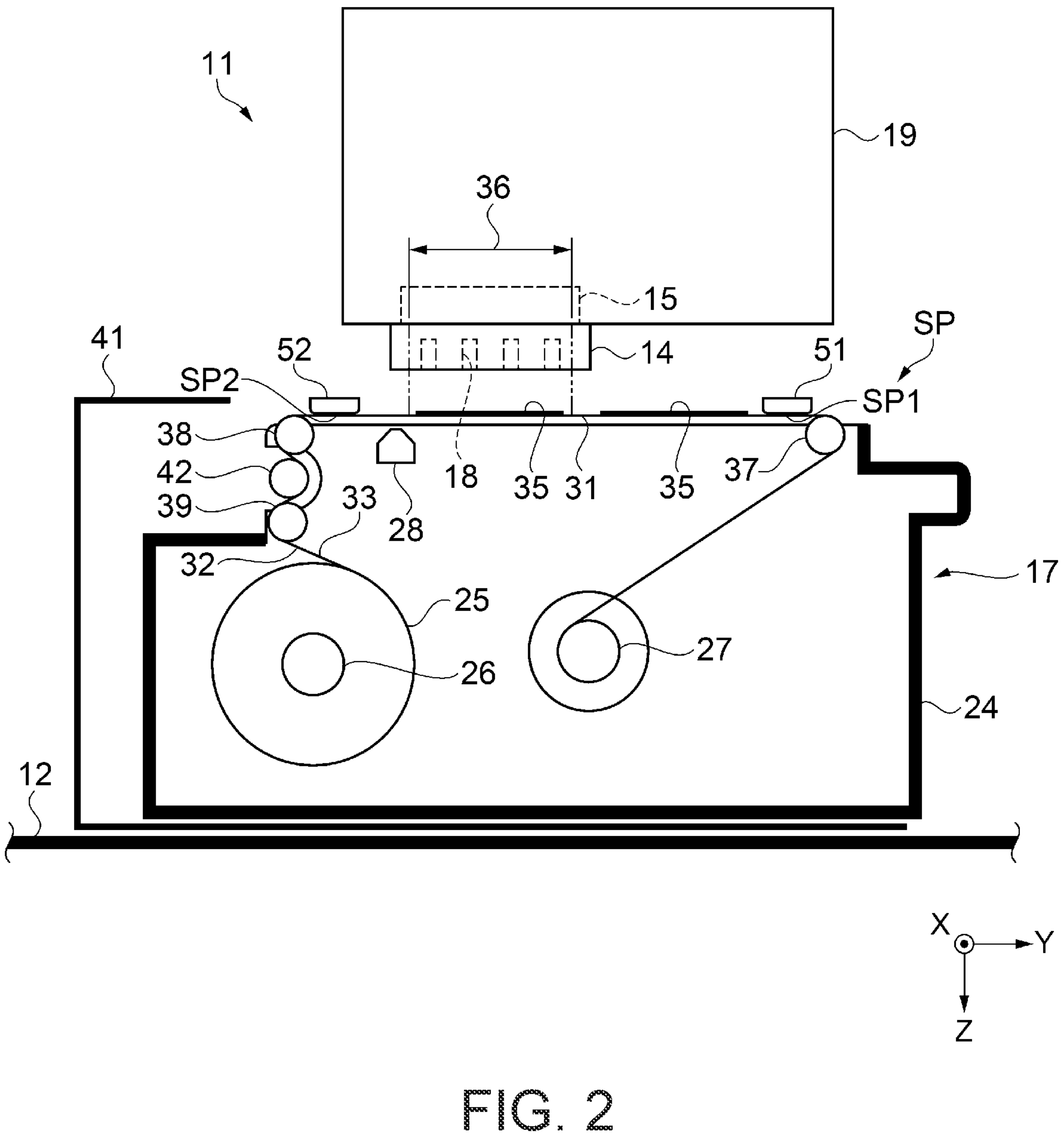
FIG. 2 is a schematic side view of the liquid ejection device.

As shown in FIG. 2, the maintenance unit 17 includes a case 24, the absorbing member 25 capable of absorbing a liquid, and rotors 26 and 27 for holding the absorbing member 25. The maintenance unit 17 includes a pushing section 28, which presses the absorbing member 25 against the ejection section 14, guide rollers 37, 38, and 39, which guide the absorbing member 25, a first regulating member 51, and a second regulating member 52.

The case 24 houses, for example, the absorbing member 25, the rotors 26 and 27, the pushing section 28, the guide rollers 37, 38, and 39, and the like. The case 24 has an opening that exposes a first surface 32 of the absorbing member 25, which will be described later, on an upper surface that is a side surface on the −Z direction side of the case 24.

The absorbing member 25 absorbs the liquid from the ejection section 14. The absorbing member 25 absorbs waste liquid. The absorbing member 25 may be, for example, a cloth or a sponge. The absorbing member 25 is a belt-shaped long member capable of absorbing liquid.

The absorbing member 25 is held by the rotors 26 and 27. The absorbing member 25 has an intermediate portion. The intermediate portion is a portion of the absorbing member 25 between the portion held by the rotor 26 and the portion held by the rotor 27. The intermediate portion is a portion between the portion wound around the rotor 26 and the portion wound around the rotor 27. The absorbing member 25 receives the liquid by flushing, cleaning, or wiping at a facing portion 31, which is the portion of the intermediate portion that faces the ejection section 14.

Figure 6:
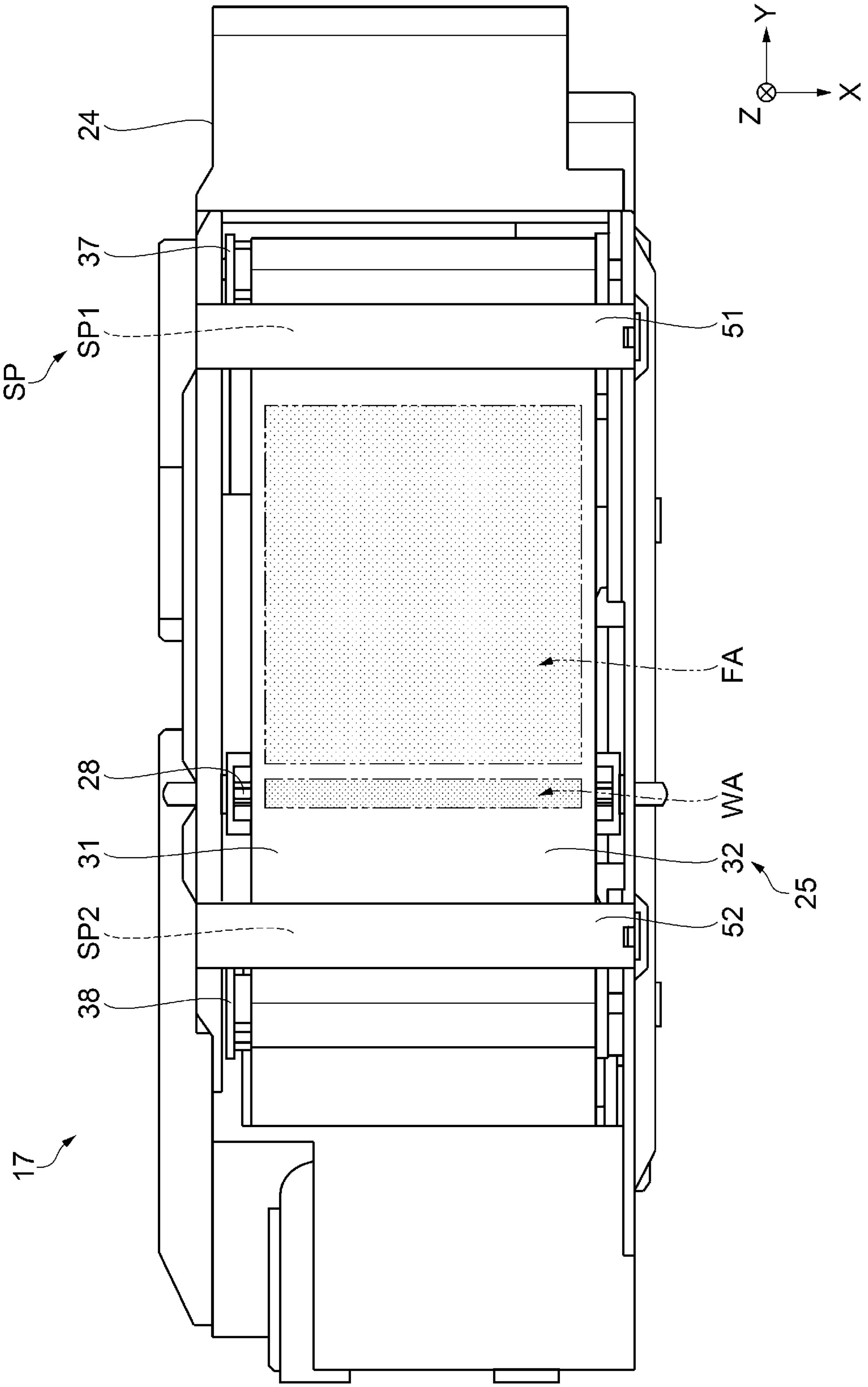
FIG. 6 is a plan view of the maintenance unit.

As shown in FIG. 6, for example, the absorbing member 25 receives the liquid that is ejected from the ejection section 14 in flushing, cleaning, or the like in the receiving region FA, which is set in the facing portion 31. For example, the absorbing member 25 receives the liquid by wiping in the wiping region WA, which is set in the facing portion 31. The wiping region WA is provided on the −Y direction side of the receiving region FA. In other words, the wiping region WA is provided in a region different from the receiving region FA of the absorbing member 25.

As shown in FIG. 2, the absorbing member 25 has the first surface 32 and a second surface 33. The first surface 32 is a surface that receives the liquid from the ejection section 14. Therefore, the first surface 32 is a surface facing the ejection section 14 in the facing portion 31. The second surface 33 is a backside surface of the first surface 32.

The rotor 26 holds unused absorbing member 25. That is, the rotor 26 holds the absorbing member 25 that is not absorbing the liquid. In the present embodiment, the rotor 26 temporarily holds used absorbing member 25, but mainly holds unused absorbing member 25. Therefore, the rotor 26 also functions as a supply section for supplying unused absorbing member 25. The case 24 rotatably holds the rotor 26.

The rotor 27 holds used absorbing member 25. That is, the rotor 27 holds the absorbing member 25 that has absorbed the liquid. Therefore, the rotor 27 also functions as a collection section for collecting used absorbing member 25. The case 24 rotatably holds the rotor 27.

The rotor 27 holds the absorbing member 25 wound in a roll shape. In the present embodiment, the rotor 27 holds the absorbing member 25 such that the first surface 32 is on the inner side. That is, the rotor 27 holds the absorbing member 25 such that the second surface 33 is on the outer side.

The rotors 26 and 27 are arranged side by side in the Y-axis direction. The rotors 26 and 27 are arranged so that their center shafts, which are the shafts around which the rotors 26 and 27 rotate, extend in the X-axis direction along which the carriage 19 scans.

The rotors 26 and 27 unwind and wind the absorbing member 25 by rotating. Hereinafter, a direction in which the absorbing member 25 is fed from the rotor 26 toward the rotor 27 by winding the absorbing member 25 around the rotor 27 is referred to as a feeding direction. In other words, the absorbing member 25 is fed toward downstream or upstream in the feeding direction by rotation of the rotors 26 and 27. The rotors 26 and 27 are an example of a transport section that transports the absorbing member 25 in the feeding direction.

A direction in which the absorbing member 25 is sent from the rotor 27 toward the rotor 26, which is a direction opposite to the feeding direction, by winding the absorbing member 25 around the rotor 26 is referred to as a returning direction. The rotor 27 is located downstream of the rotor 26 in the feeding direction. Therefore, in the present embodiment, the absorbing member 25 is mainly fed toward the downstream in the feeding direction.

The guide roller 37 is provided at a position on the −Z direction side of the rotors 26 and 27 in the Z-axis direction. The guide roller 37 is provided at a position on the +Y direction side with respect to the center of the opening of the case 24 in the Y-axis direction. The guide roller 37 is arranged so that its center shaft extends in the X-axis direction. The case 24 rotatably holds the guide roller 37.

The guide roller 38 is provided at the same position as the guide roller 37 in the Z-axis direction. The guide roller 38 is provided at a position on the −Y direction side with respect to the center of the opening of the case 24 in the Y-axis direction. The guide roller 38 is provided at an interval from the guide roller 37 in the Y-axis direction. The guide roller 38 is arranged so that its center shaft extends in the X-axis direction. The case 24 rotatably holds the guide roller 38.

The absorbing member 25 is wound around the guide rollers 37 and 38. The absorbing member 25 is wound around the guide roller 37 at an acute angle. The absorbing member 25 is wound around the guide roller 38 at an acute angle. An intermediate portion of the absorbing member 25 is wound around the guide rollers 37 and 38. The intermediate portion wound around the guide rollers 37 and 38 forms the facing portion 31. The facing portion 31 is along the X-Y plane when not pressed by the pushing section 28 described later.

As shown in FIG. 6, the guide roller 37 is provided downstream of the receiving region FA in the feeding direction. The guide roller 38 is provided upstream of the receiving region FA in the feeding direction. The guide roller 37 is an example of a downstream roller, and the guide roller 38 is an example of an upstream roller.

As shown in FIG. 2, the guide roller 39 is provided at a position between the rotor 26 and the guide roller 38 in the Z-axis direction. When the maintenance unit 17 is mounted on the mount section 41, the intermediate portion wound between the guide roller 38 and the guide roller 39 is pressed toward the +Y direction by a tension roller 42. As a result, tension is applied to the intermediate portion of the absorbing member 25.

In the present embodiment, the tension roller 42 is provided in the mount section 41. The tension roller 42 is arranged so that its center shaft extends in the X-axis direction. The mount section 41 rotatably holds the tension roller 42.

The guide rollers 37, 38, and 39 guide the absorbing member 25 unwound from the rotor 26 toward the rotor 27. The absorbing member 25 is fed from the rotor 26 to the rotor 27 via the guide roller 39, the tension roller 42, the guide roller 38, and the guide roller 37 in order from the upstream side in the feeding direction.

The pushing section 28 is provided at a position between the guide roller 37 and the guide roller 38 with respect to the feeding direction. The pushing section 28 is positioned between the guide roller 37 and the guide roller 38 in the Y-axis direction. The pushing section 28 is positioned closer to the guide roller 38 of the guide rollers 37 and 38 in the Y-axis direction. The pushing section 28 is positioned upstream of a receiving region FA (see FIG. 6) which will be described later in the feeding direction.

The pushing section 28 is provided so as to extend in the X-axis direction. The pushing section 28 includes, for example, a protruding portion protruding toward the −Z direction when viewed from the direction along the X-axis direction. The pushing section 28 is held by the case 24 such that the protruding portion extends in the X-axis direction along the facing portion 31.

The pushing section 28 touches the second surface 33. By moving the pushing section 28, the pushing section 28 presses the wiping region WA (see FIG. 6) of the facing portion 31 against the ejection section 14. The pushing section 28 is configured to move in the Z-axis direction between a pushing position and a non-contact position. The pushing position is a position where the pushing section 28 presses the wiping region WA of the facing portion 31 against the ejection section 14 in a state where the pushing section 28 is in contact with the second surface 33. The non-contact position is a position on the +Z direction side of the pushing position, where the pushing section 28 does not contact the second surface 33.

In a state where the pushing section 28 presses the facing portion 31 against the ejection section 14, the ejection section 14 and the maintenance unit 17 are relatively moved, whereby wiping is performed. In the wiping, the wiping region WA which is pressed against the ejection section 14 in the facing portion 31 is positioned on the guide roller 38 side from the center of the facing portion 31 in the Y-axis direction. The wiping region WA is located upstream of the receiving region FA in the feeding direction. Thus, the wiping can be performed by unused absorbing member 25.

In the present embodiment, the ejection section 14 moves with respect to the maintenance unit 17, but the maintenance unit 17 may move with respect to the ejection section 14, or both the ejection section 14 and the maintenance unit 17 may move. In the present embodiment, when wiping is performed, the ejection section 14 moves in the −Y direction with respect to the maintenance unit 17 in a state where the absorbing member 25 is pressed against the end of the ejection section 14 on the −Y direction side. Accordingly, the surface on which the nozzles 18 of the ejection section 14 are opened is wiped by the absorbing member 25 from the end on the −Y direction side toward the end on the +Y direction side.

The regulating section SP restricts the absorbing member 25 wound around the guide rollers 37 and 38 from floating to the −Z direction side toward the ejection section 14. The regulating section SP regulates the floating of the absorbing member 25 to the −Z direction side by contacting with the first surface 32 of the absorbing member 25. The regulating section SP includes a first regulating section SP1 and a second regulating section SP2.

Figure 5:
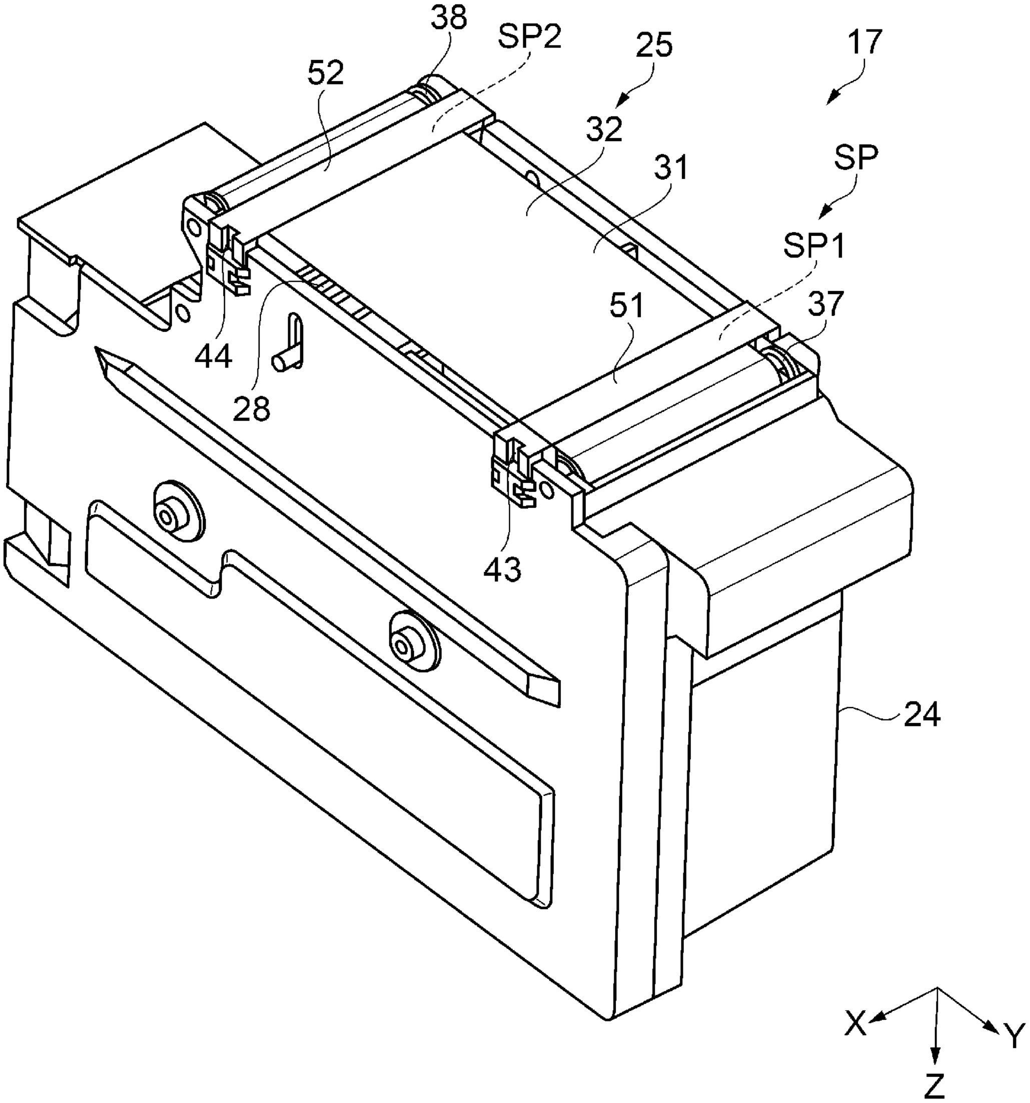
FIG. 5 is a perspective view of the maintenance unit.

As shown in FIGS. 2, 5, and 6, the first regulating section SP1 is a surface of the first regulating member 51 which faces the first surface 32 of the absorbing member 25. The first regulating member 51 of the present embodiment is provided in the maintenance unit 17. The first regulating member 51 is detachably fixed to the maintenance unit 17 by engaging with an engagement section 43 (see FIG. 5) of the case 24. Therefore, the first regulating section SP1 of the present embodiment is provided in the maintenance unit 17.

The first regulating member 51 is located on the +Z direction side with respect to the ejection section 14. Therefore, the first regulating member 51 is positioned on the +Z direction side with respect to the tip end of the protrusion of the pushing section 28 at the pushing position. The first regulating member 51 is positioned closer to the guide roller 37 than the center of the facing portion 31 in the Y-axis direction.

Therefore, the first regulating section SP1 is located closer to the guide roller 37 than the center of the facing portion 31 in the Y-axis direction. The first regulating section SP1 is positioned on the ejection section 14 side, which is the −Z direction side of the absorbing member 25 in the Z-axis direction. The first regulating section SP1 is positioned between the receiving region FA and the center shaft of the guide roller 37 in the Y-axis direction. In other words, the first regulating section SP1 is positioned on the ejection section 14 side of the absorbing member 25 positioned between the receiving region FA and the center shaft of the guide roller 37 with respect to the feeding direction.

The first regulating section SP1 is disposed at a position closer to the guide roller 37 than to the receiving region FA in the feeding direction. When viewed from the direction along the Z-axis direction, at least a part of the first regulating section SP1 is disposed at a position overlapping the guide roller 37. To be specific, when viewed from the direction along the Z-axis direction, the end of the first regulating section SP1 on the +Y direction side overlaps the circumferential surface of the guide roller 37 on the −Y direction side and the circumferential surfaces of the flanges provided at both ends of the guide roller 37 in the X-axis direction on the −Y direction side. In other words, when the receiving region FA is viewed from the front, at least a part of the first regulating section SP1 is disposed at a position overlapping the guide roller 37.

The second regulating section SP2 is a surface of the second regulating member 52 facing the first surface 32 of the absorbing member 25. The second regulating member 52 of the present embodiment is provided in the maintenance unit 17. The second regulating member 52 is detachably fixed to the maintenance unit 17 by engaging with an engagement section 44 (see FIG. 5) of the case 24. Therefore, the second regulating section SP2 of the present embodiment is provided in the maintenance unit 17.

The second regulating member 52 is positioned on the +Z direction side with respect to the ejection section 14. Therefore, the second regulating member 52 is positioned on the +Z direction side with respect to the tip end of the protrusion of the pushing section 28 at the pushing position. The second regulating member 52 is positioned closer to the guide roller 38 than to the center of the facing portion 31 in the Y-axis direction.

Therefore, the second regulating section SP2 is positioned closer to the guide roller 38 than to the center of the facing portion 31 in the Y-axis direction. The second regulating section SP2 is positioned on the ejection section 14 side, which is the −Z direction side of the absorbing member 25 in the Z-axis direction. The second regulating section SP2 is positioned between the receiving region FA and the center shaft of the guide roller 38 in the Y-axis direction. In other words, the second regulating section SP2 is positioned on the ejection section 14 side of the absorbing member 25 positioned between the receiving region FA and the center shaft of the guide roller 38 with respect to the feeding direction.

The second regulating section SP2 is disposed at a position closer to the guide roller 38 than to the receiving region FA in the feeding direction. When viewed from the direction along the Z-axis direction, the second regulating section SP2 is disposed at a position at which at least a part thereof overlaps the guide roller 38. To be specific, when viewed from the direction along the Z-axis direction, the end of the second regulating section SP2 on the −Y direction side overlaps the circumferential surface of the guide roller 38 on the +Y direction side and the circumferential surface of the flanges provided at both ends of the guide roller 38 in the X-axis direction on the +Y direction side. In other words, when the receiving region FA is viewed from the front, at least a part of the second regulating section SP2 is disposed at a position overlapping the guide roller 38.

It is preferable that the first regulating section SP1 and the second regulating section SP2 are formed of a material whose characteristics do not easily change even when liquid ejected from the ejection section 14 adheres thereto. Therefore, for example, when the first regulating member 51 and the second regulating member 52 are formed of a resin material, polypropylene (PP), polyethylene (PE), polytetrafluoroethylene (PTFE), modified polyphenylene ether (PPE), or the like can be adopted as the resin material.

It is preferable that the resistance of the first regulating section SP1 and the second regulating section SP2 is small when the absorbing member 25 moves in a state of being in contact with the first surface 32 of the absorbing member 25. Therefore, it is preferable that the surface roughness of the first regulating member 51 and the second regulating member 52 is small. Therefore, for example, in a case where the first regulating section SP1 and the second regulating section SP2 are formed of rolled steel plates, it is preferable to perform bending or hemming bending on the end edge portions.

Next, a collection process of the waste liquid by the maintenance unit 17 will be described. The maintenance unit 17 collects the liquid as the waste liquid from the ejection section 14 when the maintenance of the ejection section 14 is performed. The maintenance unit 17 may collect the waste liquid in a state where the absorbing member 25 stands still, or may collect the waste liquid while feeding the absorbing member 25 in the feeding direction. For example, when the amount of a waste liquid is large as in cleaning, the maintenance unit 17 may collect the waste liquid while feeding the absorbing member 25 in the feeding direction.

Figure 3:
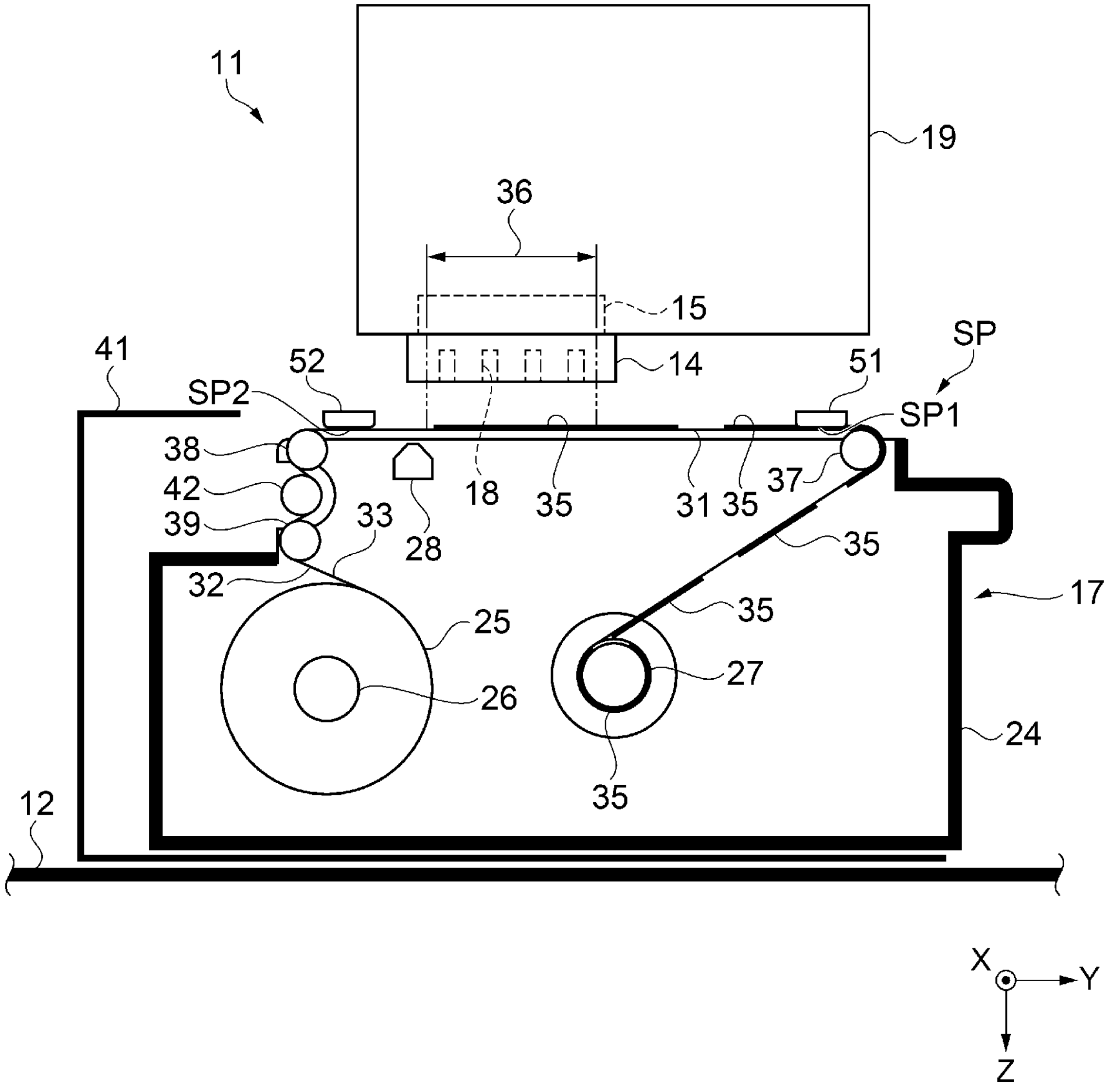
FIG. 3 is a schematic side view of the liquid ejection device when maintenance of the ejection section is performed multiple times from the state shown in FIG. 2.

As shown in FIGS. 2 and 3, when the absorbing member 25 absorbs the liquid as the waste liquid, an absorption portion 35 is formed in the absorbing member 25. The absorption portion 35 is a portion of the absorbing member 25 that has absorbed the liquid. The length of the absorption portion 35 formed in the absorbing member 25, the number of the absorption portion 35, and the like vary depending on the type of maintenance, the number of times of maintenance, and the like.

For example, the maintenance unit 17 feeds the absorbing member 25 in the feeding direction every time the maintenance of the ejection section 14 is performed. For example, when the maintenance of the ejection section 14 is performed, the maintenance unit 17 collects the waste liquid with unused absorbing member 25. Therefore, when the amount of the waste liquid collected in one maintenance is large, or when the maintenance is performed a plurality of times, the absorption portion 35 may be wound around the rotor 27.

After the absorbing member 25 absorbs the liquid due to the maintenance of the ejection section 14, the processing section 15 applies energy to the liquid absorbed by the absorbing member 25. As a result, the liquid absorbed by the absorbing member 25 is hardened. When the liquid absorbed by the absorbing member 25 is hardened, a possibility that the liquid drips from the absorbing member 25 or the liquid is scattered from the absorbing member 25 to contaminate the inside of the housing 12 is reduced.

The liquid ejected from the ejection section 14 may emit an odor. For example, when the ejection section 14 ejects UV ink, which is an example of ink, a monomer contained in the UV ink is likely to emit an odor. Therefore, if the UV ink is left absorbed by the absorbing member 25, an odor may be generated from the maintenance unit 17. In this regard, because the monomer included in the UV ink is changed into a polymer by the processing section 15 curing the liquid absorbed by the absorbing member 25, the risk that odor will be generated from the maintenance unit 17 is reduced.

The timing at which the processing section 15 applies energy to the liquid absorbed by the absorbing member 25 is not limited. The processing section 15 may apply energy to the liquid after the maintenance of the ejection section 14 is completed, or may apply energy to the liquid in parallel with the maintenance of the ejection section 14. For example, the processing section 15 may apply energy to the liquid absorbed by the absorbing member 25 every time maintenance of the ejection section 14 is performed. That is, the liquid may be cured each time the absorbing member 25 absorbs the liquid.

For example, the processing section 15 may apply energy to the liquid absorbed by the absorbing member 25 after maintenance of the ejection section 14 is performed a plurality of times. For example, the processing section 15 may apply energy to the liquid absorbed by the absorbing member 25 while the temperature raising section 22 raises the temperature of the liquid. In this case, since the liquid absorbed by the absorbing member 25 is cured during the time when the liquid ejection device 11 cannot perform recording, the time when recording cannot be performed is effectively used.

The time during which the processing section 15 applies energy to the liquid absorbed by the absorbing member 25 may be different based on, for example, the amount of liquid absorbed by the absorbing member 25. For example, the time for which the processing section 15 applies energy to the liquid absorbed by the absorbing member 25 may be changed by changing the time for which the voltage is applied to the processing section 15.

For example, by changing the feeding amount of the absorbing member 25 per unit time by the rotors 26 and 27, the time during which the processing section 15 applies energy to the liquid absorbed by the absorbing member 25 may be changed. As the amount of liquid absorbed by the absorbing member 25 increases, the time during which the processing section 15 applies energy to the liquid absorbed by the absorbing member 25 is increased. Thus, the liquid absorbed by the absorbing member 25 is appropriately cured.

In the present embodiment, the processing section 15 is mounted on the carriage 19. Therefore, when the liquid absorbed by the absorbing member 25 is to be cured, the carriage 19 moves to a position where the processing section 15 is located immediately above the maintenance unit 17. As a result, the processing section 15 faces the facing portion 31. In this embodiment, the processing section 15 is configured to release energy toward the facing portion 31 of the absorbing member 25. When the processing section 15 is moved immediately above the maintenance unit 17, it faces the first surface 32. Therefore, when curing the liquid absorbed by the absorbing member 25, the processing section 15 discharges energy toward the first surface 32.

In the present embodiment, when the ejection section 14 faces the facing portion 31, the processing section 15 is located on the −X direction side of the facing portion 31. Therefore, when the carriage 19 moves in the +X direction from the position at the maintenance time of the ejection section 14, the processing section 15 faces the facing portion 31 and can cure the liquid absorbed by the absorbing member 25.

In a case where the liquid absorbed by the absorbing member 25 is to be cured by the processing section 15, the maintenance unit 17 causes the absorption portion 35 to face the processing section 15 by rotating the rotors 26 and 27. For example, the maintenance unit 17 positions the absorption portion 35 immediately below the processing section 15.

In the present embodiment, in a case where the liquid absorbed by the absorbing member 25 is to be cured by the processing section 15, the processing section 15 emits energy to the absorbing member 25 while the carriage 19 moves in the X-axis direction. According to this, the dimension in the X-axis direction of the section in which the processing section 15 can apply energy at the same time can be made smaller than the width of the absorbing member 25.

In the curing process accompanying movement of the carriage 19, the processing section 15 may emit energy when the processing section 15 is positioned directly above the absorption portion 35, or may emit energy at all times during movement of the carriage 19.

For example, it is assumed that the dimension in the X-axis direction of the section in which the processing section 15 can apply energy simultaneously is equal to or larger than the width of the absorbing member 25. In this case, the processing section 15 may discharge energy toward the entire width of the absorbing member 25 simultaneously while the processing section 15 is stationary directly above the absorption portion 35.

The processing section 15 discharges energy toward a portion located in a curing area 36 with respect to the facing portion 31. The curing area 36 is a portion in which the processing section 15 can apply energy simultaneously to the liquid absorbed by the absorbing member 25 in the Y-axis direction. That is, the curing area 36 is a portion to which the energy for curing the liquid reaches.

In the present embodiment, the curing area 36 is a section in which the processing section 15 can simultaneously irradiate ultraviolet rays in the Y-axis direction. The maintenance unit 17 rotates the rotors 26 and 27 such that the absorption portion 35 overlaps the curing area 36 in the Y-axis direction. Thus, the processing section 15 cures the liquid absorbed by the absorbing member 25.

For example, when the length of the absorption portion 35 in the Y-axis direction is equal to or less than the dimension of the curing area 36, the maintenance unit 17 stops the absorbing member 25 at a position where the absorption portion 35 overlaps the curing area 36. Then, the processing section 15 cures the absorption portion 35.

For example, in a case where the length of the absorption portion 35 in the Y-axis direction is longer than the dimension of the curing area 36, the absorption portion 35 may be cured by the processing section 15 while the maintenance unit 17 winds the absorbing member 25 around the rotor 27. Specifically, the processing section 15 applies energy to the liquid in the absorption portion 35 while winding the absorbing member 25 around the rotor 27. That is, the processing section 15 sequentially cures the absorption portion 35 from the downstream side in the feeding direction.

Here, "while winding the absorbing member 25 around the rotor 27" may be a configuration in which winding of the absorbing member 25 is stopped during winding, and winding is performed again after a predetermined time has elapsed. Therefore, the configuration in which "the processing section 15 applies energy to the liquid of the absorption portion 35 while the absorbing member 25 is wound around the rotor 27" also includes a configuration in which the winding of the absorbing member 25 is stopped during winding and winding is performed again after energy is applied to the liquid.

For example, in a case where the length of the absorption portion 35 in the Y-axis direction is longer than the dimension of the curing area 36, the absorption portion 35 may be cured by the processing section 15 while the maintenance unit 17 rewinds the absorbing member 25 on the rotor 26. Specifically, the processing section 15 applies energy to the liquid of the absorption portion 35 while rewinding the absorbing member 25 around the rotor 26. That is, the processing section 15 sequentially cures the absorption portion 35 from the upstream side in the feeding direction.

Here, "while rewinding the absorbing member 25 to the rotor 26" may be a configuration in which the rewinding of the absorbing member 25 is stopped during rewinding and rewinding is performed again after a predetermined time elapses. Therefore, the configuration in which "the processing section 15 applies energy to the liquid of the absorption portion 35 while rewinding the absorbing member 25 to the rotor 26" also includes a configuration in which rewinding of the absorbing member 25 is stopped during rewinding and rewinding is performed again after energy is applied to the liquid.

At this time, the rotor 26 may rewind the absorbing member 25 continuously or intermittently. This reduces the risk that the absorption portion 35 in which the liquid is not cured is wound around the rotor 26. For example, in a case where the processing section 15 sequentially cures the liquid of the absorption portion 35 from the downstream side in the feeding direction, there is a concern that the absorption portion 35 in which the liquid is not cured will be wound around the rotor 26. In this case, there is a risk that the liquid of the absorption portion 35 will adhere to the unused portion.

Similarly, in a case where a plurality of absorption portions 35 is provided, the absorption portions 35 may be sequentially cured from the absorption portion 35, among the plurality of absorption portions 35, that is positioned on the upstream side in the feeding direction. This reduces the risk that the absorption portion 35 in which the liquid is not cured is wound around the rotor 26.

Figure 11:
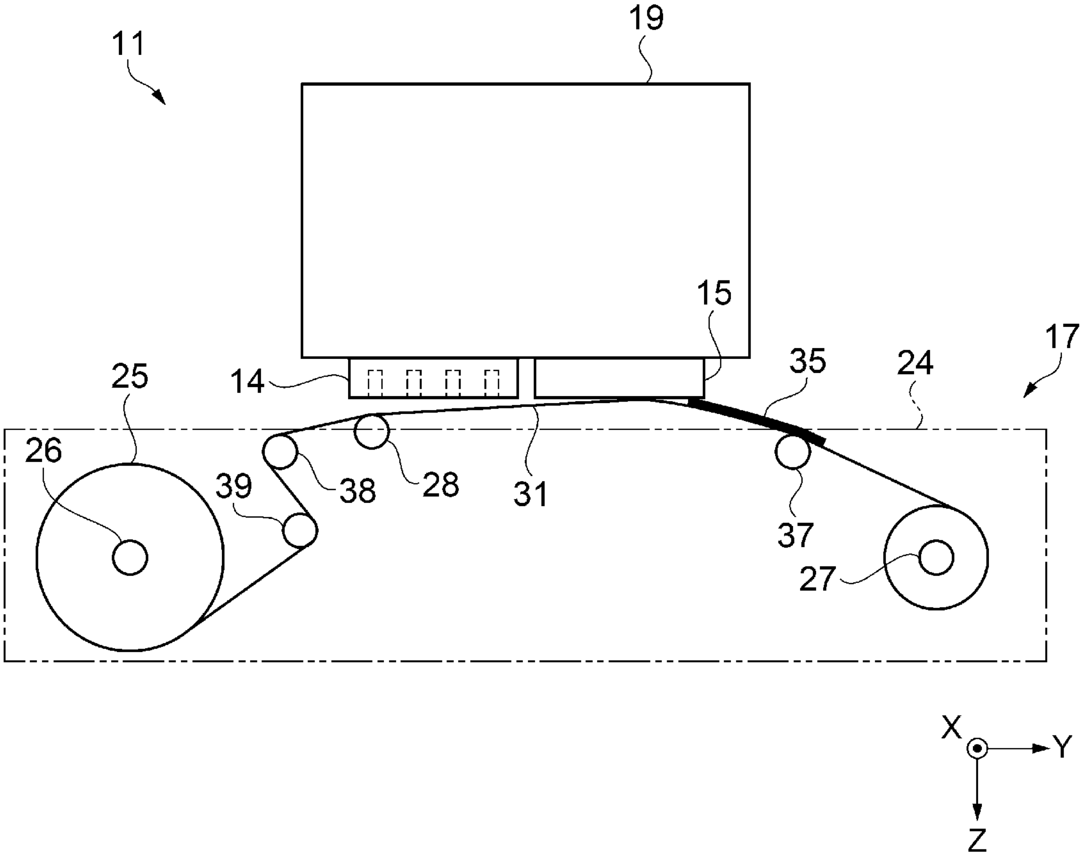
FIG. 11 is a schematic side view showing a liquid ejection device without a regulating section.

The absorption portion 35 with cured liquid is wound up by the rotor 27. At this time, in a process in which the absorption portion 35 having cured liquid is wound around the rotor 27, the absorption portion 35 having cured liquid passes by the guide roller 37. The absorption portion 35 having cured liquid is less likely to be deformed than the absorption portion 35 having liquid that is not cured. Therefore, there is a risk that the absorption portion 35 having cured liquid does not follow the circumferential surface of the guide roller 37. As a result, in a case where the liquid ejection device 11 does not include the regulating section SP, there is a risk that the facing portion 31 wound between the guide roller 37 and the guide roller 38 may float in a direction approaching the ejection section 14 (see FIG. 11).

In this regard, the first regulating section SP1 is provided in the maintenance unit 17 of the present embodiment. When the absorption portion 35 that is passing by the guide roller 37 floats to the −Z direction side, the first regulating section SP1 touches the first surface 32 of the absorbing member 25. Accordingly, a risk that the facing portion 31 of the absorbing member 25 floats to the −Z direction side toward the ejection section 14 is reduced. Therefore, the facing portion 31 of the absorbing member 25 is prevented from contacting any one of the ejection section 14 and the processing section 15.

In a case where the absorption portion 35 is cured by the processing section 15 while the absorbing member 25 is being rewound around the rotor 26, the absorption portion 35 having cured liquid passes by the guide roller 38. At this time, there is a risk that the absorption portion 35 having cured liquid does not follow the circumferential surface of the guide roller 38. As a result, in a case where the liquid ejection device 11 does not include the regulating section SP, there is a risk that the facing portion 31 wound between the guide roller 37 and the guide roller 38 will float in a direction approaching the ejection section 14.

In this regard, the maintenance unit 17 of the present embodiment is provided with the second regulating section SP2. When the absorption portion 35 passing by the guide roller 38 floats to the −Z direction side, the second regulating section SP2 touches the first surface 32 of the absorbing member 25. Accordingly, a risk that the facing portion 31 of the absorbing member 25 floats to the −Z direction side toward the ejection section 14 is reduced. Therefore, the facing portion 31 of the absorbing member 25 is prevented from contacting any one of the ejection section 14 and the processing section 15.

In the absorbing member 25, depending on the amount of the liquid received by the first surface 32, the received liquid may seep out to the second surface 33. In the present embodiment, since the processing section 15 faces the first surface 32, it is difficult to cure the liquid that seeps to the second surface 33. For this reason, there is a case where the rotor 26 winds up the absorbing member 25 in a state in which there is a risk that the curing of the liquid that seeped to the second surface 33 was insufficient. In this regard, in a case of winding the absorbing member 25 after energy is emitted toward the first surface 32 by the processing section 15, the rotor 26 winds the absorbing member 25 with the first surface 32 inside. For this reason, it is possible to reduce a concern that the liquid that seeps to the second surface 33 adheres to unused absorbing member 25.

On the other hand, if the absorption portion 35 is wound around the rotor 27 before the processing section 15 applies energy to the liquid in the absorption portion 35, the liquid in the absorption portion 35 adheres to the used absorbing member 25 held by the rotor 27. As a result, the amount of liquid in the absorption portion 35 that was not cured is reduced, so that the absorption portion 35 can be easily cured.

Therefore, the maintenance unit 17 may cause the absorption portion 35 to be once taken up by the rotor 27, and then after rewinding the absorption portion 35 in the returning direction from the rotor 27, the absorption portion 35 may be cured by the processing section 15. As described above, the maintenance unit 17 may rewind the absorbing member 25 from the rotor 27 in the returning direction after the absorption portion 35 is wound around the rotor 27 before the processing section 15 applies energy to the liquid of the absorption portion 35. Then, the maintenance unit 17 may cure the rewound absorption portion 35 using the processing section 15.

Next, an example of the waste liquid collection process by the control section 16 controlling the maintenance unit 17 will be described. In the maintenance of the ejection section 14, the maintenance unit 17 performs an absorption process in which the liquid ejected as a waste liquid from the ejection section 14 is absorbed by the absorbing member 25.

After the absorption process is completed, the maintenance unit 17 performs a curing process of curing the liquid absorbed by the absorbing member 25. The curing treatment may be performed after a plurality of absorption processes. The timing at which the curing process is performed is not limited. For example, the curing process may be executed based on an instruction from the user, or may be executed when the temperature raising section 22 performs increasing the temperature of the liquid. The absorption process and the curing process are executed by the control section 16 controlling the maintenance unit 17. The liquid discharged as a waste liquid from the ejection section 14 is collected in the maintenance unit 17 by the absorption process and the curing process.

The maintenance unit 17 may cure the liquid after the absorbing member 25 absorbs the liquid, or may cure the liquid while the absorbing member 25 absorbs the liquid. In a case where the liquid is cured while being absorbed by the absorbing member 25, the absorbing member 25 absorbs the liquid discharged as a waste liquid from the ejection section 14 while being sent from the rotor 26 to the rotor 27, and receives energy emitted from the processing section 15.

Figure 4:
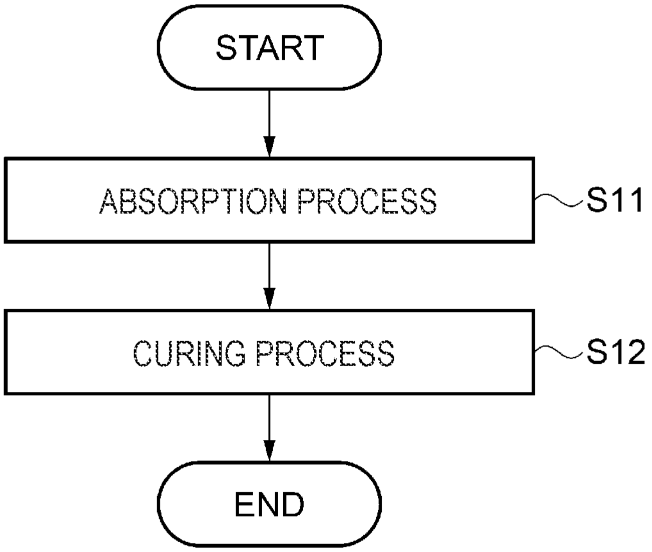
FIG. 4 is a flowchart showing an example of a waste liquid collection process associated with a maintenance of an ejection section.

Next, with reference to the flowchart shown in FIG. 4, the control executed by the control section 16 in each step when the waste liquid collection process including the rewinding operation in the curing process is performed will be described in order. In the present embodiment, the flow of the process executed when the control section 16 performs the waste liquid collection process associated with the maintenance of the ejection section 14 corresponds to a control method of the liquid ejection device 11.

In step S11, the control section 16 executes the absorption process. In the absorption process, the control section 16 executes the absorbing member 25 to absorb the waste liquid. At this time, the control section 16 causes an unused portion of the absorbing member 25 to face the ejection section 14 by controlling the rotors 26 and 27.

In order to collect the waste liquid from the ejection section 14, the control section 16 causes the unused portion of the absorbing member 25 to absorb the waste liquid. For example, in a case of wiping, the control section 16 executes the wiping region WA of the absorbing member 25 to touch the ejection section 14. For example, in the case of flushing or cleaning, the control section 16 executes to receive the liquid ejected from the ejection section 14 in the receiving region FA of the absorbing member 25. Thus, the absorption portion 35 is formed in the receiving region FA of the absorbing member 25. When the liquid waste has been absorbed by the absorbing member 25, the control section 16 finishes the absorption process.

When finishing the process of step S11, the control section 16 executes to shift the process to step S12.

In step S12, the control section 16 executes a curing process. To reduce the amount of liquid in the absorption portion 35 before the processing section 15 applies energy to the liquid in the absorption portion 35, the control section 16 causes the absorption portion 35 to be held by the rotor 27. In other words, the control section 16 winds the absorption portion 35 around the rotor 27. At this time, the control section 16 feeds the absorbing member 25 in the feeding direction by controlling the rotors 26 and 27.

When the rotor 27 holds the absorption portion 35, the liquid of the absorption portion 35 adheres to the used absorbing member 25. When there is a plurality of absorption portions 35, for example, the control section 16 executes such that the rotor 27 holds all the absorption portions 35. Therefore, the control section 16 executes the absorption portion 35 to be wound around the rotor 27 before the processing section 15 applies energy to the liquid in the absorption portion 35.

Next, the control section 16 rewinds the absorbing member 25 and cures the liquid of the absorption portion 35. At this time, the control section 16 executes the rewinding operation of rewinding the absorbing member 25 in the returning direction by controlling the rotors 26 and 27. The control section 16 positions the absorption portion 35 in the curing area 36 by performing the rewinding operation. In a case where there is a plurality of absorption portions 35, the control section 16 positions the absorption portion 35 on the most upstream side with respect to the feeding direction among the plurality of absorption portions 35 in the curing area 36.

The control section 16 executes to cure the liquid of the absorption portion 35 by controlling the processing section 15 and the carriage 19. The control section 16 controls the processing section 15, the carriage 19, and the rotors 26 and 27 to sequentially cure the liquid absorbed by the absorbing member 25 from the upstream side in the feeding direction. Here, the rewinding operation means a period from the start to the completion of the rewinding.

In step S12, the control section 16 may execute the absorbing member 25 to be cured while rewinding the absorbing member 25 in the returning direction, or may execute the absorbing member 25 to be cured after completing the rewinding. For example, when the absorption portion 35 does not fit in the curing area 36 or when there is a plurality of absorption portions 35, the absorbing member 25 is cured while being rewound in the returning direction. When there is only one absorption portion 35 and the absorption portion 35 falls within the curing area 36, the absorption portion 35 is cured after the rewinding is finished. That is, the processing section 15 applies energy to the liquid of the absorption portion 35 in parallel with the rewinding operation of rewinding the absorbing member 25 in the returning direction or after the rewinding operation.

For the rewinding operation, a configuration may be adopted in which the rewinding of the absorbing member 25 is stopped during the rewinding operation, and the rewinding is performed again after a predetermined time elapses. Therefore, the configuration in which the processing section 15 applies energy to the liquid of the absorption portion 35 in parallel with the rewinding operation also includes a configuration in which the rewinding of the absorbing member 25 is stopped during the rewinding operation and the rewinding is performed again after energy is applied by the processing section 15.

In the rewinding operation, the control section 16 may rewind in the returning direction an amount of the absorbing member 25 longer than the length of the absorbing member 25 sent in the feeding direction when the absorption portion 35 is wound by the rotor 27 in step S11. For example, the control section 16 may rewind the absorbing member 25 such that the used absorbing member 25 to which the liquid of the absorption portion 35 is expected to have adhered is located in the curing area 36 by winding the absorption portion 35 around the rotor 27. In this case, the control section 16 applies energy to the liquid of the absorption portion 35 from the processing section 15 in parallel with the rewinding operation. Thus, the liquid absorbed by the absorbing member 25 is cured.

The control section 16 controls the rotors 26 and 27 to cause the rotor 27 to wind the absorbing member 25 including the absorption portion 35 in which the liquid is cured. Accordingly, the liquid absorbed by the absorbing member 25 from the ejection section 14 is collected in the rotor 27 as waste liquid. When the process of step S12 is completed, the control section 16 ends the process.

As described above, according to the maintenance unit 17 and the liquid ejection device 11 according to the first embodiment, the following effects can be obtained.

The maintenance unit 17 can receive the liquid that is discharged as a waste liquid from the ejection section 14 which can eject the liquid that is cured by the hardening process onto the medium 99. The maintenance unit 17 includes the belt-shaped absorbing member 25 configured to absorb the liquid, and to receive the liquid at a receiving region FA of the absorbing member 25. The maintenance unit 17 includes the rotors 26 and 27 capable of transporting the absorbing member 25 in the feeding direction. The maintenance unit 17 includes the guide roller 37, which is provided on the downstream side of the receiving region FA in the feeding direction and around which the absorbing member 25 is wound. The maintenance unit 17 includes the first regulating section SP1, which is provided on the ejection section 14 side of the absorbing member 25, which is positioned between the receiving region FA and the center shaft of the guide roller 37 with respect to the feeding direction. Accordingly, the maintenance unit 17 can suppress uplift of the absorbing member 25 when the absorbing member 25 with cured liquid is wound around the guide roller 37 by the first regulating section SP1.

The first regulating section SP1 is disposed at a position closer to the guide roller 37 than the receiving region FA in the feeding direction. According to this, the maintenance unit 17 can efficiently suppress uplift of the absorbing member 25 wound around the guide roller 37.

When the receiving region FA is viewed from the front, at least a part of the first regulating section SP1 is disposed at a position overlapping the guide roller 37. According to this, the maintenance unit 17 can more efficiently suppress uplift of the absorbing member 25 wound around the guide roller 37.

The absorbing member 25 is wound around the guide roller 37 at an acute angle. Since uplift of the absorbing member 25 can be suppressed by the first regulating section SP1, the absorbing member 25 can be wound around the guide roller 37 at an acute angle. By winding the absorbing member 25 around the guide roller 37 at an acute angle, the size of the maintenance unit 17 can be reduced. The maintenance unit 17 further includes the guide roller 38, which is provided upstream of the receiving region FA in the feeding direction and around which the absorbing member 25 is wound. The maintenance unit 17 further includes the second regulating section SP2, which is provided on the ejection section 14 side of the absorbing member 25 that is positioned between the receiving region FA and the center shaft of the guide roller 38 with respect to the feeding direction. The rotors 26 and 27 can transport the absorbing member 25 in the returning direction, which is opposite to the feeding direction. According to this, the maintenance unit 17 can suppress uplift of the absorbing member 25 when the absorbing member 25 with cured liquid is wound around the guide roller 38 by the second regulating section SP2.

The second regulating section SP2 is disposed at a position closer to the guide roller 38 than to the receiving region FA in the feeding direction. According to this, the maintenance unit 17 can efficiently suppress uplift of the absorbing member 25 wound around the guide roller 38.

When the receiving region FA is viewed from the front, the second regulating section SP2 is disposed at a position where at least a part thereof overlaps the guide roller 38. According to this, the maintenance unit 17 can more efficiently suppress uplift of the absorbing member 25 winding around the guide roller 38.

The absorbing member 25 is wound around the guide roller 38 at an acute angle. Since uplift of the absorbing member 25 can be suppressed by the second regulating section SP2, the absorbing member 25 can be wound around the guide roller 38 at an acute angle. By winding the absorbing member 25 around the guide roller 38 at an acute angle, the size of the maintenance unit 17 can be reduced.

The absorbing member 25 is provided with a wiping region WA capable of wiping the ejection section 14 in an area different from the receiving region FA. According to this configuration, the maintenance unit 17 can have both a function of maintaining the ejection section 14 and a function of collecting the liquid ejected as a waste liquid from the ejection section 14.

The liquid ejection device 11 includes the ejection section 14, which can eject liquid that to be cured by a hardening process onto the medium 99, the maintenance unit 17, which can receive liquid ejected as a waste liquid from the ejection section 14, and the first regulating section SP1. The maintenance unit 17 includes the belt-shaped absorbing member 25 configured to absorb the liquid, and to receive the liquid at a receiving region FA of the absorbing member 25. The maintenance unit 17 includes the rotors 26 and 27 capable of transporting the absorbing member 25 in the feeding direction. The maintenance unit 17 includes the guide roller 37, which is provided on the downstream side of the receiving region FA in the feeding direction and around which the absorbing member 25 is wound. In addition, the first regulating section SP1 is provided on the ejection section 14 side of the absorbing member 25 that is positioned between the receiving region FA and the center shaft of the guide roller 37 with respect to the feeding direction. According to this, in the liquid ejection device 11, it is possible to suppress uplift of the absorbing member 25 when the absorbing member 25 with cured liquid is wound around the guide roller 37 by the first regulating section SP1.

The liquid ejection device 11 further includes the second regulating section SP2. The maintenance unit 17 includes the guide roller 38, which is provided on the upstream side of the receiving region FA which receives the liquid of the absorbing member 25 in the feeding direction and around which the absorbing member 25 is wound. The rotors 26 and 27 can transport the absorbing member 25 in the returning direction, which is opposite to the feeding direction. In addition, the second regulating section SP2 is provided on the ejection section 14 side of the absorbing member 25 that is positioned between the receiving region FA and the center shaft of the guide roller 38 with respect to the feeding direction. According to this, in the liquid ejection device 11, it is possible to suppress uplift of the absorbing member 25 when the absorbing member 25 with cured liquid is wound around the guide roller 38 by the second regulating section SP2.

The maintenance unit 17 has a wiping region WA capable of wiping the ejection section 14 in an area different from the receiving region FA of the absorbing member 25. According to this aspect, the liquid ejection device 11 includes the maintenance unit 17 having both the function of maintaining the ejection section 14 and the function of collecting the liquid discharged from the ejection section 14 as the waste liquid. Therefore, the liquid ejection device 11 can be reduced in size.

The liquid is cured by ultraviolet irradiation performed as a hardening process. According to this, it is possible to obtain the above-described effects in the liquid ejection device 11, which cures the liquid with UV light.

The liquid is cured by heat applied as a hardening process. According to this, it is possible to obtain the above-described effects in the liquid ejection device 11 which cures the liquid by heating the liquid.

The first regulating section SP1 is provided in the maintenance unit 17. According to this, the liquid ejection device 11 can be provided with a suitable configuration in which uplift of the absorbing member 25 is suppressed by the first regulating section SP1.

The second regulating section SP2 is provided in the maintenance unit 17. According to this, the liquid ejection device 11 can be provided with a suitable configuration in which uplift of the absorbing member 25 is suppressed by the second regulating section SP2.

The maintenance unit 17 according to the above embodiment of the present disclosure basically has the above-described configuration, it is of course possible to change or omit the partial configuration within the scope not departing from the gist of the present disclosure. Although the liquid ejection device 11 according to the above embodiment of the present disclosure basically has the above-described configuration, it is of course possible to change or omit the partial configuration within the scope not departing from the gist of the present disclosure. The above-described embodiments and other embodiments described below can be implemented in combination with each other within a range that does not technically conflict. Other embodiments will be described below.

In the above embodiment, the liquid discharged by the ejection section 14 may not be a liquid that is hardened by applying energy. For example, the liquid ejected by the ejection section 14 may be a liquid containing a reactive resin, for example, a two-component reaction type ink. A two-component reaction type ink is an example of an ink and an example of a liquid. In this case, the processing section 15 cures the liquid by supplying the reaction liquid to the liquid. The reaction liquid is an example of a liquid. In this case, the two-component reaction type ink is cured by the reaction liquid encountering due to the supply of the reaction liquid as a hardening process.

In this case, the processing section 15 includes the nozzles 18 configured to eject a reaction liquid to the ejected liquid containing the reactive resin. Alternatively, the nozzles 18 from which the reaction liquid is ejected may be disposed in the ejection section 14. In this case, the processing section 15 may be provided in the ejection section 14. The processing section 15 fixes the liquid to the medium 99 by ejecting the reaction liquid to the liquid ejected to the medium 99 while the carriage 19 is moving. According to this, in the liquid ejection device 11 which cures the liquid with the reaction liquid, it is possible to obtain the same effects as the effects of the liquid ejection device 11 according to the first embodiment.

Figure 7:
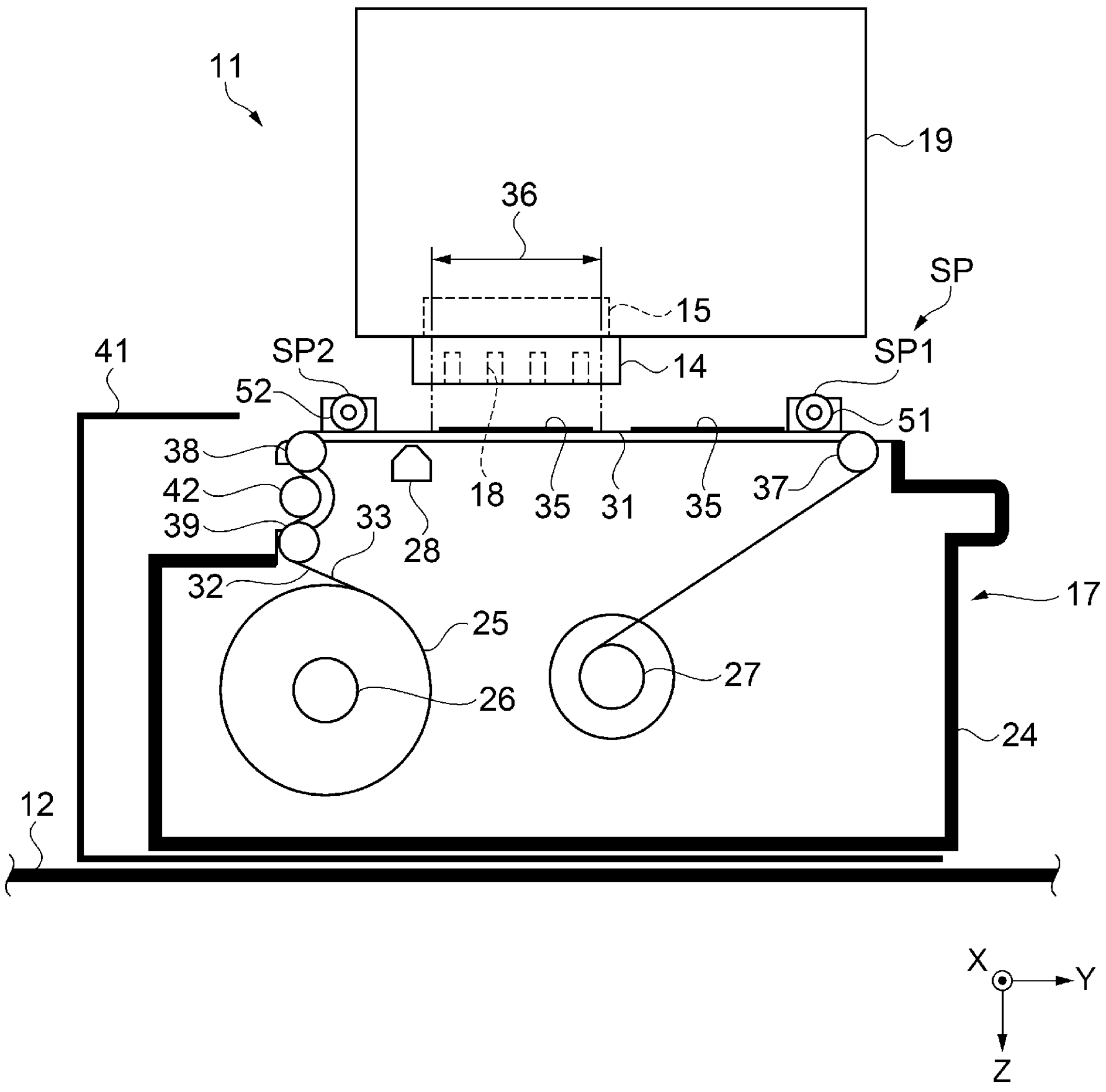
FIG. 7 is a schematic side view showing another embodiment of the maintenance unit.

In the above-described embodiment, the surfaces of the first regulating member 51 and the second regulating member 52 facing the first surface 32 of the absorbing member 25 may not be flat surfaces. The surfaces of the first regulating member 51 and the second regulating member 52 facing the first surface 32 of the absorbing member 25 may be curved surfaces. For example, as shown in FIG. 7, the first regulating member 51 and the second regulating member 52 may be rotary rollers provided in the maintenance unit 17. In this case, the first regulating section SP1 and the second regulating section SP2 are the circumferential surfaces of the rotary rollers facing the first surface 32 of the absorbing member 25. In this case, the first regulating member 51 and the second regulating member 52 are disposed such that the center shafts thereof extend in the X-axis direction. The first regulating member 51 and the second regulating member 52 are rotatably held by the case 24.

In the above-described embodiment, the first regulating section SP1 and the second regulating section SP2 may have unevenness on a surface facing the first surface 32 of the absorbing member 25. According to this, it is possible to reduce resistance when the absorbing member 25 moves in a state in which the first surface 32 of the absorbing member 25 is in contact with any one of the first regulating section SP1 and the second regulating section SP2.

In the above-described embodiment, the first regulating section SP1 may not be a surface of the first regulating member 51 facing the first surface 32 of the absorbing member 25. The second regulating section SP2 may not be a surface of the second regulating member 52 which faces the first surface 32 of the absorbing member 25. For example, as shown in FIG. 8, the first regulating section SP1 and the second regulating section SP2 may be a surface facing the first surface 32 of the absorbing member 25 in a protruding section integrally formed with the case 24. In this case, the protruding section is provided on the +Z direction side of the upper wall of the case 24 that covers the −Z direction side of the guide rollers 37 and 38. In this case, the first regulating section SP1 is positioned at the end on the +Y direction side of the opening of the case 24 which exposes the first surface 32 of the absorbing member 25.

Figure 9:
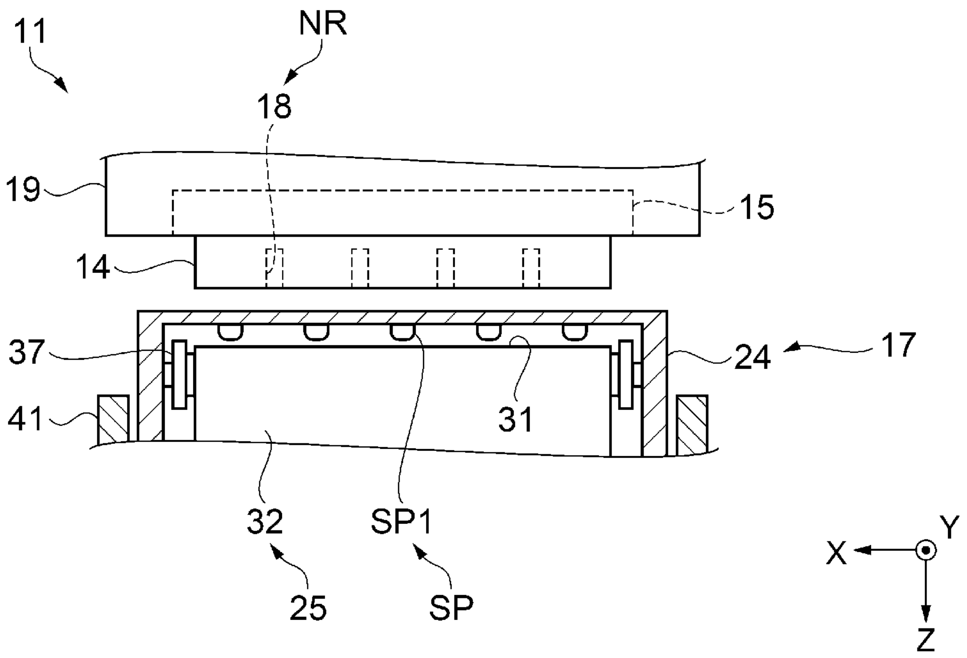
FIG. 9 is a sectional view showing the S9-S9 cross section shown in FIG. 8.

In this case, the second regulating section SP2 is positioned at the end on the −Y direction side of the opening of the absorbing member 25. As shown in FIG. 9, the protruding section serving as the regulating section SP may be a plurality of projections arranged at intervals in the X-axis direction. The plurality of projections serving as the regulating section SP may have a rib shape extending in the Y-axis direction. For example, as illustrated in FIGS. 8 and 9, it is assumed that the ejection section 14 is positioned to face the facing portion 31 of the absorbing member 25 in the maintenance of the ejection section 14. In this case, when viewed from the direction along the Z-axis direction, the plurality of protrusions serving as the regulating section SP may be disposed at positions that do not overlap the plurality of nozzle groups NR formed by the plurality of nozzles 18 of the ejection section 14.

Figure 10:
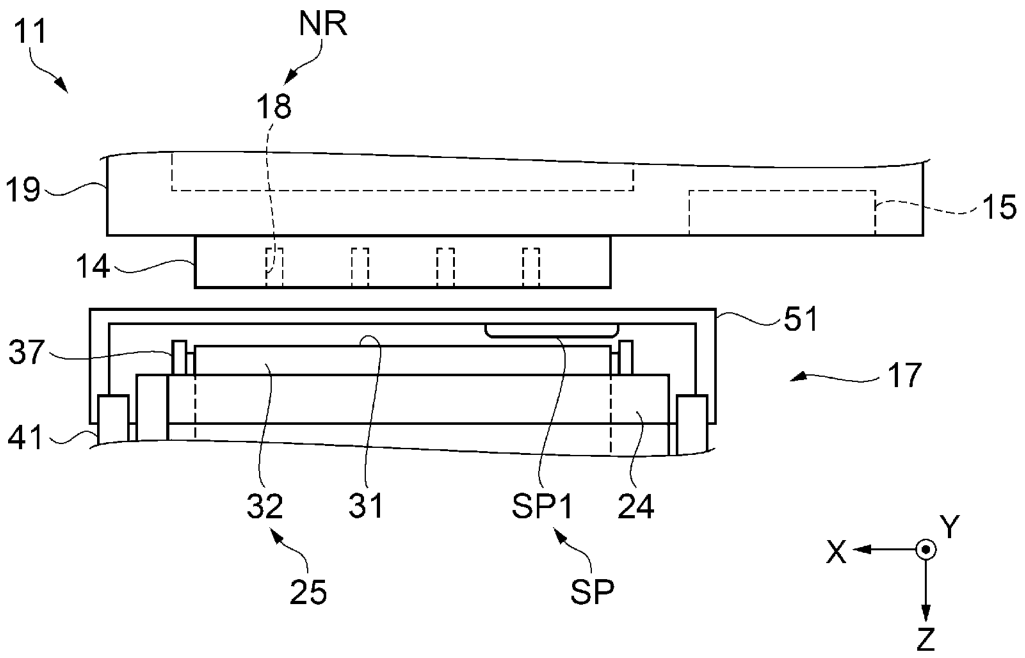
FIG. 10 is a schematic side view showing another embodiment of the maintenance unit.

In the above embodiment, the regulating section SP may not be provided in the maintenance unit 17. For example, the regulating section SP may be provided in the mount section 41. For example, as shown in FIG. 10, the first regulating member 51 provided with the first regulating section SP1 is detachably fixed to the mount section 41. In this case, similarly, the second regulating member 52 provided including the second regulating section SP2 is also detachably fixed to the mount section 41. For example, the regulating section SP may be integrally formed with a member constituting the mount section 41.

In the present embodiment described above, the regulating section SP may not be opposed to the first surface 32 of the absorbing member 25 over the X-axis direction which is the width direction of the absorbing member 25. For example, the dimension in the X-axis direction of the regulating section SP opposed to the first surface 32 of the absorbing member 25 may be smaller than the width of the absorbing member 25. In this case, as shown in FIG. 10, the first regulating section SP1 may be a protruding surface that protrudes in the +Z direction from a surface of the first regulating member 51 which faces the first surface 32 of the absorbing member 25.

For example, as illustrated in FIG. 10, it is assumed that the ejection section 14 is positioned to face the facing portion 31 of the absorbing member 25 in the maintenance of the ejection section 14. It is assumed that the liquid that is most easily cured by the curing process among the different types of liquids is discharged from the nozzle group NR on the most-X direction side among the plurality of nozzle groups NR of the ejection section 14. In this case, the regulating section SP may be disposed on the first surface 32 of the absorbing member 25 at a position facing the region for collecting the liquid discharged from the nozzles of the nozzle group NR that are closest to the −X direction side. In addition, as the liquid that is easily cured by the curing process, in a case where the curing process is the irradiation of ultraviolet rays, a transparent ink such as a varnish that does not include a pigment component is exemplified.

In the above-described embodiment, the absorbing member 25 may be wound around the guide roller 37 at an obtuse angle. The absorbing member 25 may be wound around the guide roller 38 at an obtuse angle.

In the above embodiment, if it is possible to receive the liquid ejected from the ejection section 14 in the maintenance of the ejection section 14, the facing portion 31 of the absorbing member 25 may not be aligned along the X-Y plane even when it is not pressed by the pushing section 28. In this case, the facing portion 31 may be an intermediate portion between the absorbing member 25 held by the rotor 26 and the absorbing member 25 held by the rotor 27. In this case, the rotor 26 is an example of an upstream roller, and the rotor 27 is an example of a downstream roller. In this case, the guide rollers 37, 38, and 39 may be omitted.

In the embodiment described above, when viewed from the direction along the Z-axis direction, the end of the first regulating section SP1 on the +Y direction side may not overlap the circumferential surface of the guide roller 37 on the −Y direction side. In this case, when viewed from the direction along the Z-axis direction, the end of the first regulating section SP1 on the +Y direction side may overlap with the circumferential surface on the −Y direction side of the flange provided at both ends of the guide roller 37 in the X-axis direction. Alternatively, the first regulating section SP1 may not overlap the guide roller 37 when viewed from the direction along the Z-axis direction. In this case, the first regulating section SP1 is positioned between the receiving region FA and the guide roller 37 in the Y-axis direction.

In the embodiment described above, when viewed from the direction along the Z-axis direction, the end of the second regulating section SP2 on the −Y direction side may not overlap the circumferential surface of the guide roller 38 on the +Y direction side. In this case, when viewed from the direction along the Z-axis direction, the end of the second regulating section SP2 on the −Y direction side may overlap the circumferential surface on the +Y direction side of the flanges provided at both ends of the guide roller 38 in the X-axis direction. Alternatively, the second regulating section SP2 may not overlap with the guide roller 38 when viewed from the direction along the Z-axis direction. In this case, the second regulating section SP2 is positioned between the receiving region FA and the guide roller 38 in the Y-axis direction.

In the above-described embodiment, in a case where the rewinding operation of rewinding the absorbing member 25 in the returning direction is not performed, the maintenance unit 17 may not include the second regulating section SP2. In a case where the absorption portion 35 with cured liquid does not pass by the guide roller 38 in the rewinding operation, the second regulating section SP2 may not be provided.

What is claimed is:

1. A maintenance unit configured to receive liquid discharged from nozzles of an ejection section that eject the liquid, the liquid being cured by a hardening process, the maintenance unit comprising:

a belt-shaped absorbing member configured to absorb the liquid and to receive the liquid at a receiving region of the absorbing member;

a transport section configured to transport the absorbing member in a feeding direction;

a downstream roller provided downstream of the receiving region in the feeding direction and around which winds the absorbing member; and a first regulating section that is provided on the ejection section side of the absorbing member that is located between the receiving region and the center shaft of the downstream roller with respect to the feeding direction, wherein in a normal direction normal to a nozzle surface that the nozzles open, the first regulating section is located between the downstream roller and the nozzle surface.

2. The maintenance unit, according to claim 1, wherein the first regulating section is disposed at a position closer to the downstream roller than to the receiving region in the feeding direction.

3. The maintenance unit, according to claim 1, wherein at least a part of the first regulating section is disposed at a position overlapping the downstream roller when viewed along the normal direction.

4. The maintenance unit, according to claim 1, wherein the absorbing member winds around the downstream roller at an acute angle.

5. The maintenance unit, according to claim 1, further comprising:

an upstream roller provided upstream of the receiving region in the feeding direction and around which the absorbing member winds, and a second regulating section provided on the ejection section side of the absorbing member that is located between the receiving region and the center shaft of the upstream roller with respect to the feeding direction, wherein the transport section is configured to transport the absorbing member in a returning direction opposite to the feeding direction.

6. The maintenance unit, according to claim 5, wherein the second regulating section is disposed at a position closer to the upstream roller than to the receiving region in the feeding direction.

7. The maintenance unit, according to claim 6, wherein the second regulating section is disposed at a position at which at least a part of the second regulating section overlaps the upstream roller when viewed along the normal direction.

8. The maintenance unit, according to claim 5, wherein the absorbing member winds around the upstream roller at an acute angle.

9. The maintenance unit, according to claim 1, wherein the absorbing member is provided with, in a region different from the receiving region, a wiping region configured to wipe the ejection section.

10. The maintenance unit, according to claim 1, wherein an upstream roller is provided upstream of the receiving region in the feeding direction and around which the absorbing member winds; and a pushing section is configured to press the absorbing member against the ejection section, the pushing section being provided at a position that is closer to the upstream roller than the downstream roller with respect to the feeding direction and that is upstream of the receiving region.

11. The maintenance unit, according to claim 1, wherein the first regulating section is a flat surface.

12. A liquid ejection device comprising:

an ejection section having nozzles configured to eject liquid that is curable by a hardening process onto a medium;

a maintenance unit configured to receive the liquid discharged as a waste liquid from the ejection section; and a first regulating section, wherein the maintenance unit includes a belt-shaped absorbing member configured to absorb the liquid and to receive the liquid at a receiving region of the absorbing member, a transport section configured to transport the absorbing member in a feeding direction, a downstream roller provided downstream of the receiving region in the feeding direction and around which the absorbing member winds, and the first regulating section is provided on the ejection section side of the absorbing member located between the receiving region and the center shaft of the downstream roller with respect to the feeding direction, wherein in a normal direction normal to a nozzle surface that the nozzles open, the first regulating section is located between the downstream roller and the nozzle surface.

13. The liquid ejection device, according to claim 12, further comprising:

a second regulating section, wherein the maintenance unit includes an upstream roller provided upstream of the receiving region of the absorbing member that receives the liquid in the feeding direction and around which the absorbing member winds, the transport section is configured to transport the absorbing member in a returning direction opposite to the feeding direction, and the second regulating section is provided on the ejection section side of the absorbing member located between the receiving region and the center shaft of the upstream roller with respect to the feeding direction.

14. The liquid ejection device, according to claim 13, wherein the second regulating section is provided in the maintenance unit.

15. The liquid ejection device, according to claim 12, wherein the maintenance unit includes a wiping region configured to wipe the ejection section is provided in a region different from the receiving region of the absorbing member.

16. The liquid ejection device, according to claim 12, wherein ultraviolet irradiation is performed as the hardening process that cures the liquid.

17. The liquid ejection device, according to claim 12, wherein a chemical reaction between the liquid and a reaction liquid cures the liquid.

18. The liquid ejection device, according to claim 12, wherein a heating treatment cures the liquid as the hardening process.

19. The liquid ejection device, according to claim 12, wherein the first regulating section is provided in the maintenance unit.

* * * * *